United States Patent
Ring

(10) Patent No.: US 12,008,869 B2
(45) Date of Patent: *Jun. 11, 2024

(54) WAGERING GAME SYSTEMS AND METHODS WITH SOURCE SELECTION FEATURE

(71) Applicant: Robert Ring, San Francisco, CA (US)

(72) Inventor: Robert Ring, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,527

(22) Filed: May 24, 2022

(65) Prior Publication Data

US 2022/0284779 A1  Sep. 8, 2022

Related U.S. Application Data

(63) Continuation of application No. 15/240,667, filed on Aug. 18, 2016, now Pat. No. 11,341,820.

(60) Provisional application No. 62/206,671, filed on Aug. 18, 2015.

(51) Int. Cl.
| | |
|---|---|
| *A63F 9/24* | (2006.01) |
| *A63F 11/00* | (2006.01) |
| *G06F 7/58* | (2006.01) |
| *G06F 13/00* | (2006.01) |
| *G06F 17/00* | (2019.01) |
| *G07F 17/32* | (2006.01) |

(52) U.S. Cl.
CPC .......... *G07F 17/3293* (2013.01); *G06F 7/588* (2013.01); *G07F 17/3213* (2013.01); *G07F 17/3244* (2013.01); *G07F 17/3265* (2013.01)

(58) Field of Classification Search
CPC ... G07F 17/32; G07F 17/3211; G07F 17/3214
USPC .............................. 463/1, 10, 13, 15, 20, 39
See application file for complete search history.

(56) References Cited

U.S. PATENT DOCUMENTS

| | | | |
|---|---|---|---|
| 2007/0241498 A1* | 10/2007 | Soltys ........................ | A63F 1/16 |
| | | | 273/149 R |
| 2015/0087423 A1* | 3/2015 | Fujii .................... | G07F 17/3218 |
| | | | 463/42 |

* cited by examiner

*Primary Examiner* — Adetokunbo O Torimiro
(74) *Attorney, Agent, or Firm* — Newman Law, LLC

(57) ABSTRACT

Systems and methods for providing, conducting and modifying wagering games involving standard playing cards to include multiple sources of randomly ordered one or more decks of standard playing cards, either remotely or locally, and electronically or virtually provided cards, or through physical card shuffling sources, from which a player may select to receive cards in the wagering game for any purpose, such as to form initial or final hands in the wagering game.

15 Claims, 3 Drawing Sheets

WAGERING GAME SYSTEMS AND METHODS WITH SOURCE SELECTION FEATURE

CROSS-REFERENCE TO RELATED APPLICATIONS

This application claims the benefit of U.S. Provisional Patent Application No. 62/206,671 which was filed Aug. 18, 2015, the disclosure of which is incorporated herein by reference.

BACKGROUND OF THE INVENTION

Field of the Invention

The invention generally relates to systems and methods of providing, hosting, conducting and/or facilitating modified wagering games. In particular, the invention relates to systems and methods for providing, hosting, conducting and/or facilitating Blackjack wagering games which are modified to provide for additional player options, among other things.

Description of the Related Art

Many card games have been developed over the years and some are particularly adapted for gambling. Typically, such games include a dealer who deals cards and one or more players who place wagers on whether an outcome will be achieved based on the cards that the dealer deals. One example in this regard is Blackjack which is also known as Twenty-One.

The objective of Blackjack is for a wagering player to finish a round of play with a hand of playing cards with a sum of the total value of cards coming as close as possible to the value of twenty-one, without the player hand total exceeding twenty-one. The game is played by one or more players against a dealer with the player making an initial wager on a final outcome under the rules of blackjack, which remain fairly consistent throughout the world, and with only minor variations in different casinos or jurisdictions. Players' hands that are less than or equal to twenty-one, and exceed the value of the dealer's hand wins. All players' hands that have a lower sum than the dealer's hand and all hands that exceed the sum of twenty-one lose. Dealer and Player hands with the same total value (without the player first busting, result in ties (called a "push"). An initial two-card hand totaling twenty-one points is called blackjack, and in the absence of the dealer having a similar hand, automatically wins, without respect to the dealer's hand final; count and is often paid at odds greater than 1:1.

One conventional method of playing Blackjack uses one or more standard decks of playing cards (a fifty-two card deck without jokers). Each numbered card is counted according to its face value. The Jacks, Queens and Kings are worth ten (10), and Aces are worth either one (1) or eleven (11), depending on which is most beneficial to the count of the hand. A "ten" card therefore hereinafter includes any card which has a value of ten in the game of Blackjack, that is, a numbered 10 card, Jacks, Queens and Kings.

Once all the bets are made, the dealer will deal the cards to the players. The dealer will make two passes around the table starting with the player farthest to the left so that the players and the dealer have one card after the first pass and then receive a second card each after the second pass. The two cards dealt to the dealer or house includes one card face up or otherwise exposed to view, usually the second (and last) card dealt.

A player views an initial value of cards in the player's hand, views the dealer's up-card (the exposed card) and then makes decisions on drawing or not drawing further playing cards. This further drawing is done in an attempt to try and win the hand by having a higher count than the dealer's hand without busting, or allowing the dealer to bust the house hand. The player can "stand" on any count of twenty-one or less. Once the player exceeds a count of twenty-one or "busts," the player wager is lost, whatever the ultimate point count of the dealer's hand. Usually, the dealer must hit when with a point count of less than seventeen. Normally a dealer must stand on a soft count of at least seventeen, a soft count being a hand value where an Ace is counted as a value of eleven. House rules may vary, however.

Blackjack is already a very popular game. However, there is an interest in providing variations of existing wagering games which include new player participation opportunities, among other things.

SUMMARY OF THE INVENTION

Some embodiments of the invention are directed to systems and methods of conducting a Blackjack-based wagering game, comprising the steps of: a) providing one or more randomly ordered decks of physical playing cards; b) receiving at least one game wager; c) distributing the playing cards from the one or more randomly ordered decks of physical playing cards to form an initial player hand for each participating player and an initial dealer hand, wherein each of the initial hands include at least two playing cards and the identity of one or more of the playing cards of the initial dealer hand is revealed; d) continuing the Blackjack game according to the standard rules of Blackjack to form a final player hand, wherein each additional card provided to the initial player hand is provided responsive to first receiving a selection of a source of randomly ordered cards from each participating player until the final player hand is formed for the player, the source of randomly ordered cards being selected from at least two sources of randomly ordered decks of cards; and e) settling the game wager based on the outcome of the comparison of the hand values of the final player hand and the final dealer hand, according to the rules of Blackjack, wherein players are paid even money on the game wager responsive to a Blackjack hand.

In some embodiments, the aforementioned system and method further includes a step in which an additional game wager is received prior to receiving the selection of a source of randomly ordered cards.

In some embodiments, the aforementioned system and method further includes a step in which a fee is received prior to receiving the selection of a source of randomly ordered cards.

In some embodiments, the aforementioned system and method further includes a step in which the player selection of the source involves positioning a gaming implement on a color displayed on a gaming table surface, the color being associated with one source of randomly ordered cards.

In some embodiments, the aforementioned system and method further includes a step in which a fee is received prior to providing a second additional card from a source not selected by the player. In some embodiments, the player may select to include either the additional card or the second additional card in the final hand.

Some embodiments of the invention are directed to a system and method for providing a Blackjack-based wagering game, the system comprising a processor, communication device, user display device and a data storage device including an executable program, configured to: a) receive, by the communication device, a game wager from a participating player; b) display, through the user display device, an initial player hand for each participating player and an initial dealer hand, wherein each of the initial hands include at least two randomly generated playing cards and wherein the identity of one or more of the playing cards of the initial dealer hand is displayed; c) continue, by the processor executing the program, the Blackjack game according to the standard rules of Blackjack in forming a final player hand including receiving, by the communication device, player selections regarding the additional playing cards in the respective initial player hand, wherein each additional card provided to the initial player hand is provided responsive to first receiving a selection of a source of randomly ordered cards from each participating player until the final player hand is formed for the player, the source of randomly ordered cards being selected from at least two sources of randomly ordered decks of cards; and d) display, through the user display device, the outcome of the one or more game wagers based on the outcome of the comparison of the hand values of the final player hand and the final dealer hand according to the rules of Blackjack, wherein a Blackjack hand pays even money on the game wager.

Some embodiments of the invention are also directed to a computer-aided method of conducting a Blackjack-based wagering game that includes the steps as described above. In some embodiments, the computer-aided method may involve a device with an input device such as a bill acceptor configured to accept a bill, a ticket, and/or a cash card into the system to enable an amount of credits associated with a monetary value of the bills, ticket, and/or cash card to be credited to system for play of a game program as described herein stored in the memory device.

The communication device may be a data input and/or data output device or a remote computer terminal, such as a home computer or mobile device with access to local or global network. The system and communication device may be configured for providing the modified wagering game to players via an online system or the Internet. The processor may also be remotely located from the display device and communication device. In some embodiments, the communication device, processor and display device are mounted within a unitary housing. The aforementioned system may be an electronic gaming machine or electronic platform including multiple data input devices providing player positions.

In some embodiments, cards are randomly generated for each of the initial player hands and in forming each of the final player hands by at least two random number generators. In other embodiments, cards are randomly generated for each of the initial player hands and in forming each of the final player hands by distributing cards from one or more randomly ordered decks of standard playing cards. In still other embodiments, cards are selected from both electronic, random number generated sources and physical cards shuffling or randomly ordered card supplying sources.

DETAILED DESCRIPTION OF THE INVENTION

Figure 1:
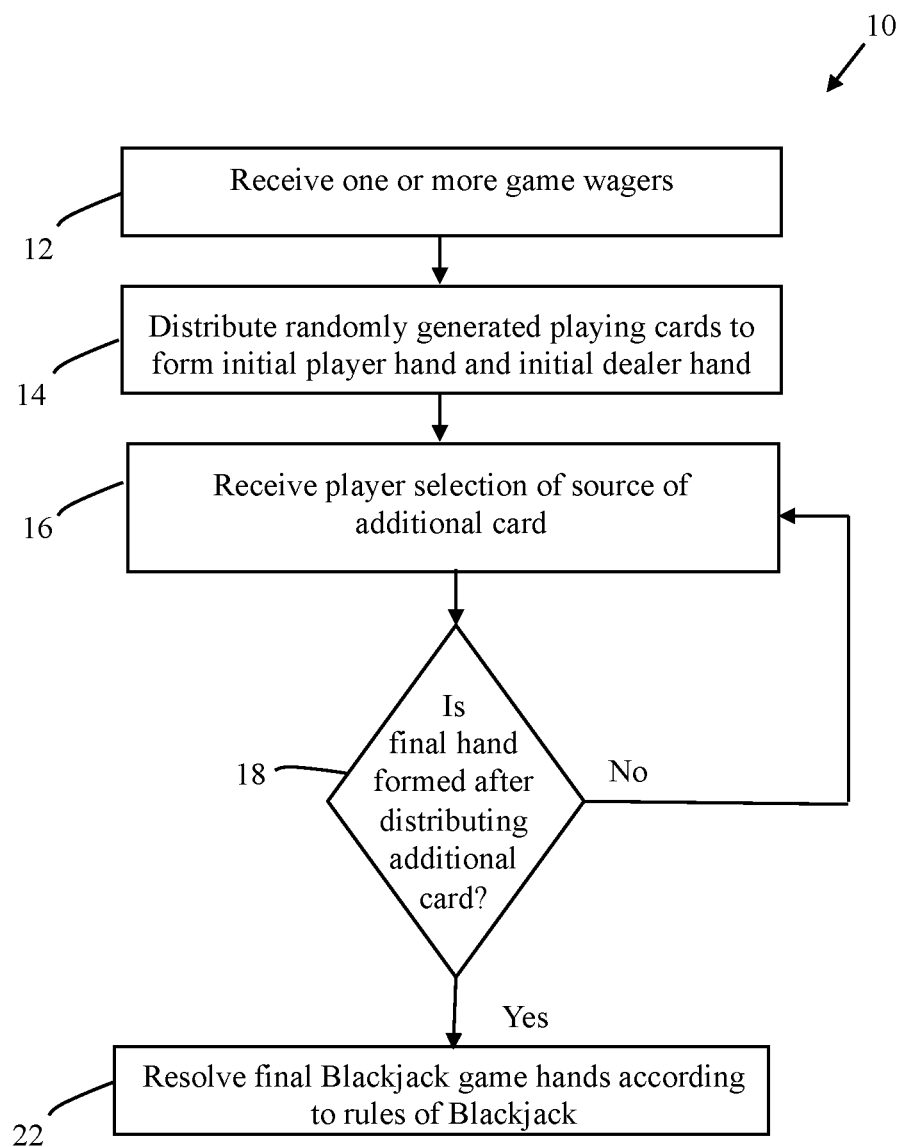
FIG. 1 is a process flow chart depicting an exemplary game play method configured and constructed according to some embodiments of the invention.

The invention is generally directed to systems and methods for providing modified wagering games involving standard playing cards in which there are multiple sources of randomly ordered one or more decks of standard playing cards or playing card information from which a player may select to receive cards in the wagering game for any purpose, such as to form initial and/or final hands in the wagering game. Playing cards or playing card information may be received from one or more sources, such as for example, either remotely or locally, and electronically or virtually provided cards, or through physical card shuffling sources.

In an exemplary embodiment, the wagering game may involve distributing cards to form an initial hand for each player from a first source of randomized cards, such as an automated card shuffler or card dealing shoe containing one or more randomly-ordered decks of cards, and thereafter providing the player with the option to receive additional cards from another one or more second sources of randomized cards, such as an additional one or more shufflers and/or card dealing shoes. In other embodiments, all cards are distributed in accordance with the receipt of player elections as to the source of each card distributed.

The wagering game may be one in which players receive a partial hand and then receive additional cards, such as draw poker, Blackjack or Baccarat, or an initial hand may be created in accordance with the invention for a game in which there is no such partial hand distributed. For example, one or two cards may be distributed in pai gow poker or Three Card Poker prior to providing player with the option to receive cards from the same or different source of cards. In other embodiments, players may be provided with the option to select the source of cards at a new stage of the game. For example, in the game of Blackjack, players may be provided with the opportunity to select from one or more sources of randomized cards after the first card is dealt to each player and the dealer. In Blackjack, the option to select the source of cards may be provided to a player wishing to hit after receiving their respective two card initial hand.

In some embodiments, players are required to place a wager or otherwise put an additional amount at risk at the game in order to receive cards from the card source of their choice. In other embodiments, no additional amount must be placed at stake.

It should be understood that receiving a wager typically also involves a player affirmatively engaging in an action that is interpreted to place a monetary amount at risk. By receiving the wager, a gaming operator or host is also placing some monetary amount at risk, which may be determined or expressed as being equal to, or a multiple of, the monetary amount which the player is placing at risk. The affirmative action of the player to place an amount at risk may include pressing a button or physically placing a gaming chip on a designated betting area on a table game felt layout. The game operator or host may receive the wager, thus indicating acceptance thereof, through a variety of actions, which may involve illumination of betting areas on a table or other displays, or by continuing to the following step 14 in which randomly ordered playing cards are distributed to form the initial player hands and the two initial dealer hands as discussed herein. It should be understood that a game wager may be a singular representation, such as a gaming chip, or more, such as two gaming chips, one for each player hand.

In some embodiments, cards forming the initial hand may be alternately drawn from each source per round. For example, in a first round of Blackjack, cards forming the initial hand are drawn from a first card dealing shoe, and players may select to hit from the first or second card dealing shoes. In the following round, cards forming the initial hand are drawn from the second card dealing shoe and players may select to hit from the first or second card dealing shoes.

FIG. 1 provides an illustrative exemplary embodiment of the invention in which the underlying game is Blackjack and which is generally referred to by the reference numeral 10. After receiving a wager from a player in step 12, an initial two card hand from a first source of randomized cards is distributed in step 14, players may have the option to select between a first or a second source of randomized cards for either all hit cards or each hit card independently as shown in steps 16 and 18 until a final player hand is formed and resolved in step 22. Players may indicate this preference by instructing the dealer as to which of the first or second sources the player wants to the hit cards to be drawn from. The instructions may be provided by physically placing their initial hand of cards or a marker in a designated area for each of the first or second sources of cards defined on the table surface. Alternatively, a player may put their own (human) hand over one of the designated areas to indicate which of the first or second sources to draw cards from. For example, the first source may be associated with a first color, such as red, and the second source may be associated with a second color, such as blue. Players may indicate the source for additional cards by putting their hand onto one of the blue or red areas and making a motion, such as a scratching or tapping motion, or by placing a wagering chip in an area in the case of the selection to receive cards from the second source requires payment or a wager.

In some embodiments, players may place a wager after receiving a card from the elected source to then receive another card from the unelected source. Players may then select one of the two cards to be added to the hand, such as the card which results in the highest ranking player hand, with the other card being discarded. Alternatively, the player must then include the additional card in the place of the first received card from the originally elected source.

It should be understood that indicating a choice of source for cards typically also involves a player affirmatively engaging in an action that is interpreted to elect the source of cards. The affirmative action of the player may include pressing a button, physically placing a marker on a designated area on a table game felt layout, or another action.

In some embodiments, the first and second sources of cards comprise a card dealing shoe with two independent card receiving spaces and card feed slots for drawing cards.

It should be understood that the methods and steps recited herein may be partially or wholly carried out in a variety of ways, such as by a dealer physically using game elements in a casino, via an electronic gaming machine (EGM) in a gaming establishment, through a computer or portable device, such as a mobile phone, capable of communicating via the Internet, global telecommunication network or world wide web. It should further be understood that the methods and systems of the invention are described herein in connection with standard playing cards for illustrative purposes only, as the methods and systems of the invention may be used with non-standard playing cards or any other items with varying distinguishable symbols.

The various illustrative embodiments of the invention may be implemented in conjunction with a physical table as a live table game utilizing physical playing cards and money or chips representative of the actual dollar value of a wager. The physical playing surface may include positions that facilitate play, such as designated hand placement areas for the player and dealer hands and designated wagering areas for receiving the game and/or second wager, which is initiated by the player placing their money or representative thereof in the designated areas. Alternatively, the methods according to the invention may be implemented in part or whole by computer hardware devices, and presented by means of computer program code which, by way of example, when executed by a processor, causes the display of the game and conditions of the hands on a display device. A random number generator may also be employed as part of the program code to simulate the dealing of playing cards from one or more randomly-ordered decks of playing cards.

Some embodiments of the invention are directed to a system for providing a wagering game such as the aforementioned modified wagering game, which may be provided at a remote location, the system comprising a processor, communication device and display device, configured to: receive a selection of a source of cards in a wagering game, which may include randomly generated and virtually presented simulated decks of cards instead of or in addition to a source of randomly-ordered physical cards, wherein cards from the selected source are dealt or distributed to the player hand. In some embodiments, the wagering game is Blackjack.

Figure 2:
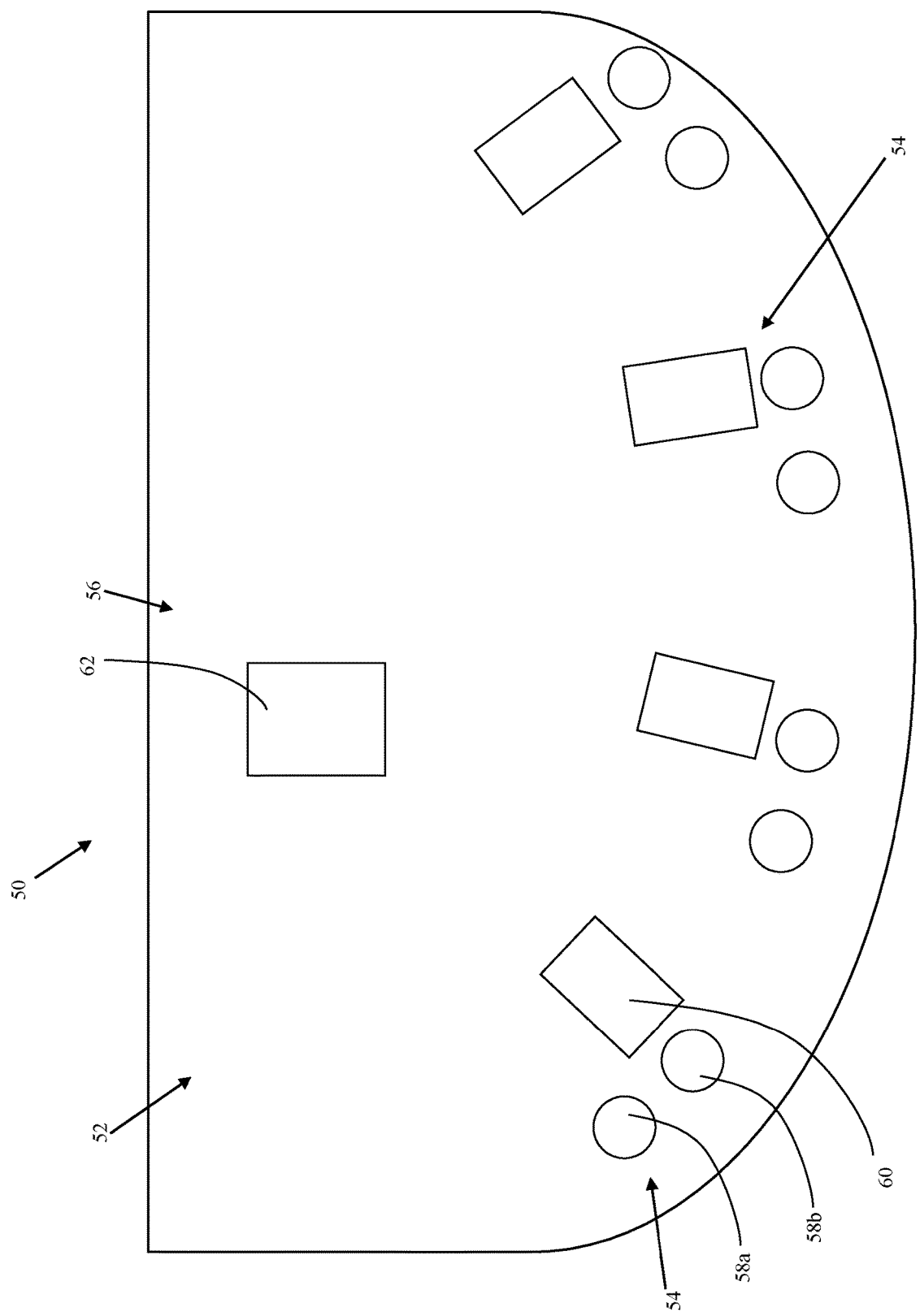
FIG. 2 is a representation of an exemplary layout for facilitating play of game methods according to some embodiments of the invention.

FIG. 2 illustrates an exemplary system 50 configured for operating in accordance with embodiments of the invention. System 50 includes a layout 52 for use in facilitating the presentment and display of a method of the invention such as method 10 or computerized version thereof. Layout 52 may be a physical felt implemented on a gaming table or a virtual representation of a felt table display presented on a display device, as it should be understood that the methods of the invention would function as described herein if any one or more of the layout, cards, dealers or wagering chips or apparatus were physically provided or virtually represented and facilitated through a computer with appropriate hardware devices and programs. System 50 further includes multiple player positions or interfaces 54 accessible on layout 52 and a dealer position or interface 56. It should be understood that the amount of interfaces 54 may vary and the amount shown in FIG. 2 is for illustrative purposes only. In this embodiment, each player position 54 includes a game wagering positions 58*a,b* for placing the game wagers, a Blackjack wager and an extra wager which may be a side wager or wager placed pursuant to versions of game 10 in which a player may pay to receive a card from a source selected by the player or an additional card from the unelected source in some embodiments discussed above. Position 54 includes a Blackjack game hand forming position 60. Dealer position 56 includes a dealer hand position 62. It should be understood that player interface 56 may further include a device for electronically receiving wagering credit, placing wagers and distributing payouts as described in this embodiment and in accordance with the invention. In some embodiments, each player position 54 on layout 52 further includes a side wagering position for receiving a wager relating to the contents of the initial hands.

Figure 3:
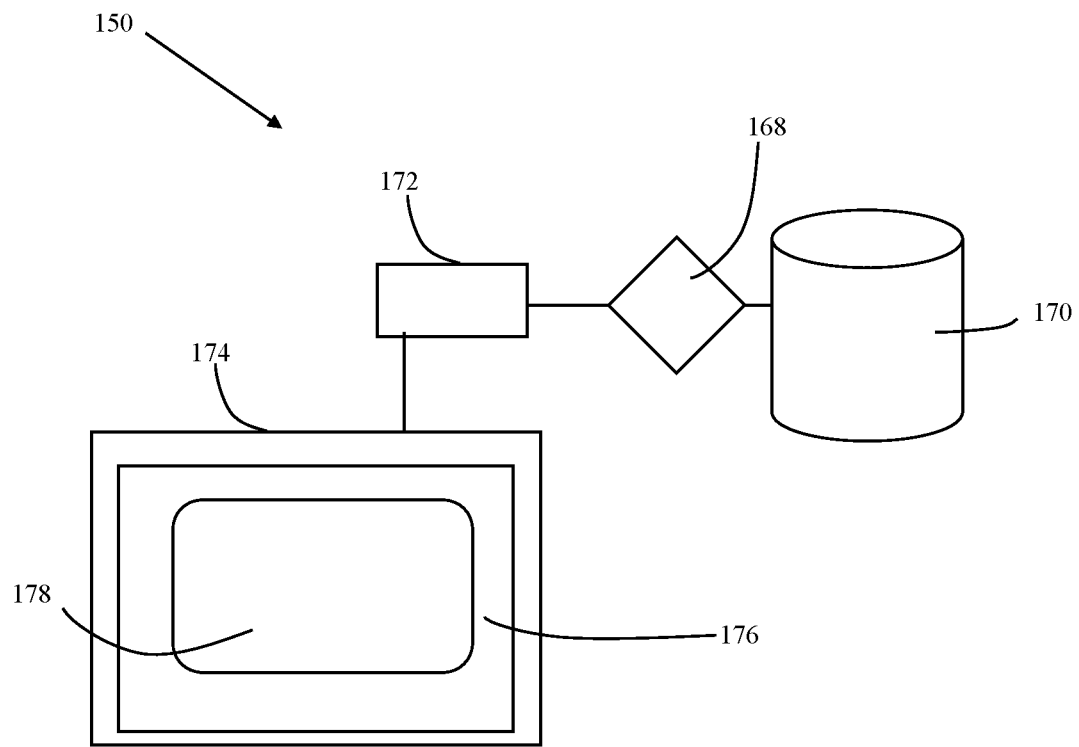
FIG. 3 is a schematic diagram depicting the components of an exemplary system configured and constructed according to some embodiments of the invention.

FIG. 3 illustrates an exemplary system 150 constructed in accordance with some embodiments of the invention. System 150 includes processing device 168 in communication with a database or memory device 170, communication or data input/output device 172 and a display device 174. In some embodiments, display device 174 is a touch-enabled device and includes a data input device component. Memory device 170 may include data relating to the underlying game and embodiments of the invention as described herein, such as the preset criteria. A player position 176 is displayed on display device 174 along with virtual representation of a layout and wagering area 178 for transmitting wagers in accordance with any of the embodiments herein, such as method 10. Game play is displayed on display device 174 and processing device 168 facilitates distribution of randomly generated hands of virtual cards to form the initial player hand for each player and the dealer, and the formation of the hand. Player input selections for wagering or selecting of source of cards to form the initial hand or receive subsequent cards may be received through display device 174. Processing device 168 accesses a program in memory device 170 for forming the dealer hand, before comparing the player and dealer hands to determine the outcome of the game and other wagers, and in particular, if any of the hands qualify for an automatic win.

Data input device 172 may include or be in communication with a bill acceptor configured to accept a bill, a ticket, and/or a cash card into the system 150 to enable an amount of credits associated with a monetary value of the bills, ticket, and/or cash card to be credited to system 150 for play of the game program in memory device 170.

Those skilled in the art will readily appreciate that the methods described herein may be incorporated in systems such as those discussed above that may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. The system of the invention may be provided on electronic platforms with multiple player positions. In addition, the system of the invention may be provided at least in part on a personal computing device, such as home computer, laptop or mobile computing device through an online communication connection or connection with the Internet. The game may be provided on a computing device, such as a home computer, kiosk or terminal which permits wagering on a live studio version of the method of the invention. Those skilled in the art will further appreciate that the precise types of software and hardware used are not vital to the full implementation of the methods of the invention so long as players and operators thereof are provided with useful access thereto or the opportunity to play the game as described herein.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments of the aforementioned system, the communication device, processor and display device are mounted within a unitary housing.

In some embodiments of the aforementioned system, the processor is remotely located from the display device and communication device.

Some embodiments of the invention are also directed to a computer-aided method of conducting a modified Blackjack wagering game that includes the steps as described above, including receiving player elections of a source of cards from which cards are dealt to each player hand accordingly. In some embodiments, the computer-aided method may involve a device with an input device such as a bill acceptor configured to accept a bill, a ticket, and/or a cash card into the system to enable an amount of credits associated with a monetary value of the bills, ticket, and/or cash card to be credited to system for play of a game program as described herein stored in the memory device.

The communication device may be a data input and/or data output device or a remote computer terminal, such as a home computer or mobile device with access to local or global network. The system and communication device may be configured for providing the modified wagering game to players via an online system or the Internet. The processor may also be remotely located from the display device and communication device.

In some embodiments, the communication device, processor and display device are mounted within a unitary housing. The aforementioned system may be an electronic gaming machine or electronic platform including multiple data input devices providing player positions.

It should be understood that the methods and steps recited herein may be partially or wholly carried out in a variety of ways, such as by a dealer physically using game elements in a casino, via an electronic gaming machine (EGM) in a gaming establishment, through a computer or portable device, such as a mobile phone, capable of communicating via the Internet, global telecommunication network or world wide web. It should further be understood that the methods and systems of the invention are described herein in connection with standard playing cards for illustrative purposes only, as the methods and systems of the invention may be used with non-standard playing cards or any other items with varying distinguishable symbols.

Those skilled in the art will readily appreciate that the methods described herein may be incorporated in systems such as those discussed above that may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. The system of the invention may be provided on electronic platforms with multiple player positions. In addition, the system of the invention may be provided at least in part on a personal computing device, such as home computer, laptop or mobile computing device through an online communication connection or connection with the Internet. The game may be provided on a computing device, such as a home computer, kiosk or terminal which permits wagering on a live studio version of the method of the invention. Those skilled in the art will further appreciate that the precise types of software and hardware used are not vital to the full implementation of the methods of the invention so long as players and operators thereof are provided with useful access thereto or the opportunity to play the game as described herein.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and equivalents thereto.

What is claimed is:

1. A method of conducting a Blackjack-based wagering gaming system with a specialized gaming table, the specialized gaming table including a playing surface having a first card distribution device and a second card distribution device mounted thereon, wherein the first card distribution device includes a first space containing a first group of randomly-ordered physical playing cards and a first card outlet positioned on the playing surface, and wherein the second card distribution device includes a second space containing a second group of randomly-ordered physical playing cards and a second card outlet positioned on the playing surface, wherein the first group of randomly-ordered physical playing cards are independent of the second group of randomly-ordered physical playing cards, the method comprising the steps of:
   a) receiving at least one game wager on a player position defined on the specialized gaming table surface, the player position being associated with a participating player;
   b) receiving a player selection of the first card distribution device or the second card distribution device from the participating player;
   c) responsive to receiving the player selection, distributing a physical playing card withdrawn from one of the first card outlet of the first card distribution device or the second card outlet of the second card distribution device according to the player selection, wherein the physical playing card is provided to a player hand at the player position on the specialized gaming table; and
   d) settling the game wager based on the outcome of the comparison of the hand values of a final player hand and a final dealer hand formed of randomly-ordered physical playing cards distributed from one or both of the first card distribution device and the second card distribution device.

2. The method according to claim 1, further comprising a step of repeating steps b) and c) until the final player hand is formed.

3. The method according to claim 1, further comprising a step of actuating steps b) and c) responsive to receiving a player selection of an additional card.

4. The method according to claim 1, further comprising a step in which a fee is received prior to receiving the selection of one of the first source and the second source of randomly ordered cards.

5. The method according to claim 1, further comprising a step in which the player selection of one of the first source and the second source involves positioning a gaming implement on a color displayed on the gaming table surface, the color being associated with one of the first source and the second source of randomly ordered cards.

6. The method according to claim 1, further comprising a step in which a fee is received prior to providing a second additional card from the first source or the second source not previously selected by the player.

7. The method according to claim 6, wherein the player may select to include either the additional card or the second additional card in the final hand.

8. A system for providing a Blackjack-based wagering game, the system comprising a processor, communication device, user display device and a data storage device including an executable program, the communication device facilitating communication with a first random number generator and a second random number generator to enable the system to:
   a) receive, by the communication device, a game wager from a participating player, wherein the game wager actuates a round of the Blackjack-based wagering game;

b) actuate the one or more random number generators to randomly generate a first source of randomly generated playing cards and a second source of randomly generated playing cards from one or more databases containing depictions of playing cards;

c) receiving, by the communication device, player selections of one or more additional playing cards to be added to an initial player hand, wherein each additional playing card provided to the initial player hand is provided responsive to first receiving through the communication device a selection of the first source or the second source from each participating player, each additional playing card being added to the initial player hand from the first or second source matching the selection; and d) display, through the user display device, the outcome of the one or more game wagers based on the outcome of the comparison of the hand values of a final player hand and a final dealer hand according to the rules of Blackjack.

9. The system as recited in claim 8, wherein the communication device, processor and display device are mounted within a unitary housing.

10. The system as recited in claim 8, wherein the processor is remotely located from the display device and communication device.

11. The system as recited in claim 8, wherein cards are randomly generated for each of the initial player hands and in forming each of the final player hands by at least two random number generators.

12. The system as recited in claim 8, wherein cards are randomly generated for each of the initial player hands and in forming each of the final player hands by distributing cards from one or more randomly ordered decks of standard playing cards.

13. The system as recited in claim 8, wherein step c) is repeated until the final player hand is formed.

14. The system as recited in claim 8, wherein step c) is actuated responsive to receiving a player selection of an additional card.

15. A specialized gaming table system, comprising:

a) a playing surface having a plurality of player positions defined thereon;

b) a first card distribution device disposed on the playing surface, wherein the first card distribution device includes i) a first space configured to contain a first group of randomly-ordered physical playing cards and ii) a first card outlet positioned on the playing surface; and c) a second card distribution device disposed on the playing surface, wherein the second card distribution device includes i) a second space configured to contain a second group of randomly-ordered physical playing cards and ii) a second card outlet positioned on the playing surface, wherein the first group of randomly-ordered physical playing cards are independent of the second group of randomly-ordered physical playing cards, the first card outlet enabling physical playing cards to be withdrawn from the first group and the second card outlet enabling physical playing cards to be withdrawn from the second group independently of one another responsive to receiving a player selection of one of the first card distribution device or the second card distribution device.

* * * * *